United States Patent [19]

Silverberg et al.

[11] Patent Number: 4,582,460

[45] Date of Patent: Apr. 15, 1986

[54] MATERIAL HANDLING TOOL WITH VACUUM BASE

[76] Inventors: Howard Z. Silverberg, 18801 Ten Acres Rd., Saratoga, Calif. 95070; Jack G. Fonss, 4163 Orin Ct., San Jose, Calif. 95124

[21] Appl. No.: 530,484

[22] Filed: Sep. 9, 1983

[51] Int. Cl.[4] .......................... B23C 1/20; B23B 47/00

[52] U.S. Cl. ........................................ 409/175; 408/76

[58] Field of Search ........................ 409/175, 178, 181; 408/76; 173/31, 32; 51/235; 269/21; 248/362, 363

[56] References Cited

U.S. PATENT DOCUMENTS

| | | | |
|---|---|---|---|
| 633,882 | 9/1899 | Moissenet | 408/76 |
| 957,897 | 5/1910 | Neubert | 408/76 |
| 2,910,895 | 11/1959 | Winslow | 51/235 X |
| 2,942,385 | 6/1960 | Pal | 409/175 X |
| 4,269,383 | 5/1981 | Hackman et al. | 248/362 X |
| 4,278,371 | 7/1981 | Meyer | 408/76 |

FOREIGN PATENT DOCUMENTS

| | | | |
|---|---|---|---|
| 122225 | 1/1919 | United Kingdom | 408/76 |
| 772745 | 11/1980 | U.S.S.R. | 408/76 |

*Primary Examiner*—William R. Briggs

*Attorney, Agent, or Firm*—Fliesler, Dubb, Meyer & Lovejoy

[57] ABSTRACT

A material working tool 10 includes a device for working material 18 and a base 12 for supporting the device 18 for working the material. The base 12 includes a rigid member 26 and a cavity 54 defined in the rigid member 26 which is connected to a source of vacuum. A seal 66 is provided about the bottom surface 56 of the rigid member 26. The seal 66 is compressed as a vacuum is created in the cavity 54 so that the rigid member 26 comes into contact with the surface of the working material allowing for the accurate positioning of the material working tool 10 relative to the material to be worked.

24 Claims, 8 Drawing Figures

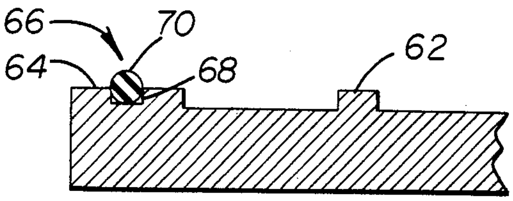
FIGURE 4
FIGURE 5
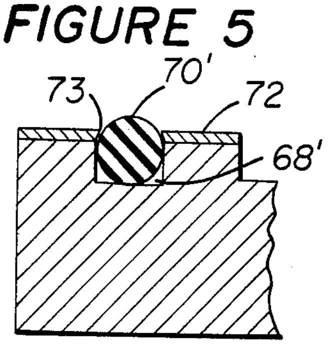
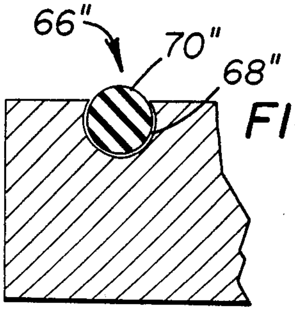
FIGURE 6
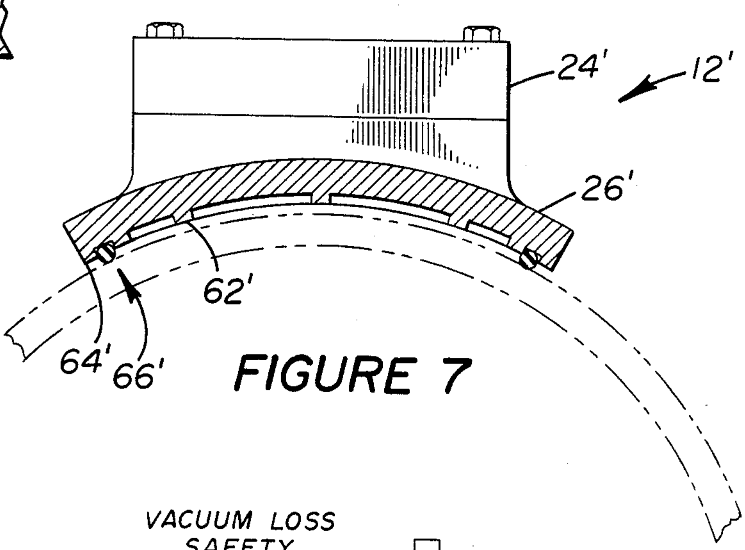
FIGURE 7
FIGURE 8
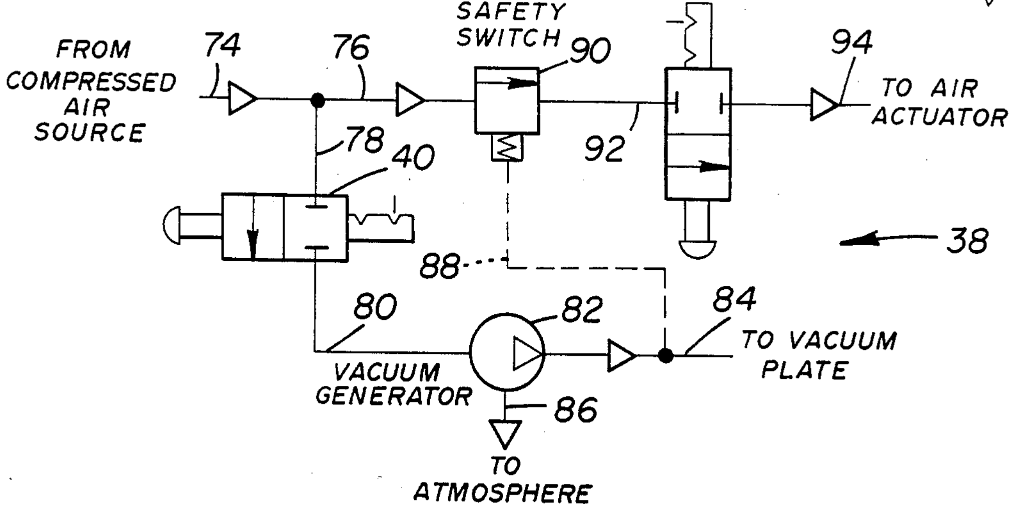

MATERIAL HANDLING TOOL WITH VACUUM BASE

FIELD OF THE INVENTION

The present invention is related to portable material handling tools and in particular to material handling tools which need to be securely fixed relative to a working surface.

BACKGROUND ART

There are many material working requirements where a power tool must be located relative to a surface to be worked and it is not possible to accurately affix the tool relative to the surface by conventional means such as clamps and the like. It can be appreciated that this is especially true in situations where, for example, a large planar surface is being machined at a central location and it would be inconvenient to provide a large clamping jig to accurately and securely position the tool relative to the planar surface. This is especially true for large metal, concrete or tiled surfaces.

In the past this problem has been partially solved by using material working tools which have bases which include electromagnets. The tool can be accurately positioned and then the electromagnet turned on to secure the tool to the working surface so that the material working procedure can commence. While ideal for steel and other ferrous materials, such tools will not work with, for example, aluminum and other non-ferrous materials.

One solution that has been used in the past for drilling precision holes in aluminum and the like is to drill several holes in the aluminum which are of a nonprecise nature. Bolts or other fasteners are then mounted through the holes and are used to secure a steel plate to the aluminum structure. Then the magnetic base of a material working tool can be secured to the steel plate and the precision machining can be accomplished. After this is completed, the bores through which the steel plate was secured are filled with aluminum. Quite naturally such a process is time-consuming and expensive.

Another approach to this problem is through the use of a vacuum base to which the material working tool can be secured. The base is placed on the working surface and a vacuum is generated in the base to secure the tool to the working surface. Generally such devices include one or more flexible rubber cups which form vacuum cavities. The cups can deform and conform to the working surface. While such a base can be fastened to a number of surfaces including non-ferrous metal surfaces as well as ceramic, plastic and glass surfaces, it has been found that such a base does not allow for accurate positioning of the material working tool during the material working process as the tool is allowed to vibrate and move excessively. Some such devices use stabilizing points which are located adjacent to the suction cups. However, these stabilizing points have proven ineffective in aiding in the accurate positioning of the material working tool relative to the working surface.

Accordingly there is a need to provide a material working tool which includes a base and which can be secured accurately relative to a work surface.

SUMMARY OF THE INVENTION

The present invention is directed to overcoming the disadvantages of the prior art.

In one aspect of the invention, a material working tool comprises means for working the material, base means for supporting the means for working the material, and means for securing the base means to the means for working the material. The base means includes a rigid member, a cavity defined in the rigid member, the cavity adapted to be connected to a source of vacuum and a seal means located about the cavity and adapted for providing a seal between the rigid plate and the work surface.

In another aspect of the invention the seal means includes a groove defined in the rigid member and located about the cavity and a resilient seal member located in the groove.

In yet another aspect of the invention, the groove is dimensioned with respect to the resilient seal member such that the resilient seal member is compressed between the rigid plate and a work surface when vacuum is applied to the cavity so that the rigid member comes into contact with the work surface.

In still another aspect of the invention a vacuum support base comprises a rigid member and a cavity defined in the rigid member. The cavity is adapted to be connected to a source of vacuum. The support base further includes seal means located about the cavity and adapted for providing a seal between the rigid plate and a work surface.

The above device solves the problem associated with the prior art in that it provides a vacuum base which can be accurately and securely positioned on a work surface.

BRIEF DESCRIPTION OF THE FIGURES

FIG. 4 is a cross-sectional view taken through line 4—4 in FIG. 3.

FIG. 5 depicts an alternative sealing means of an embodiment of the invention.

FIG. 6 depicts yet another alternative sealing means of an embodiment of the invention. FIG. 7 depicts an alternative base of an embodiment of the invention.

FIG. 8 depicts a schematic of the vacuum system of the invention.

DETAILED DESCRIPTION OF THE PREFERRED EMBODIMENT

Figure 1:
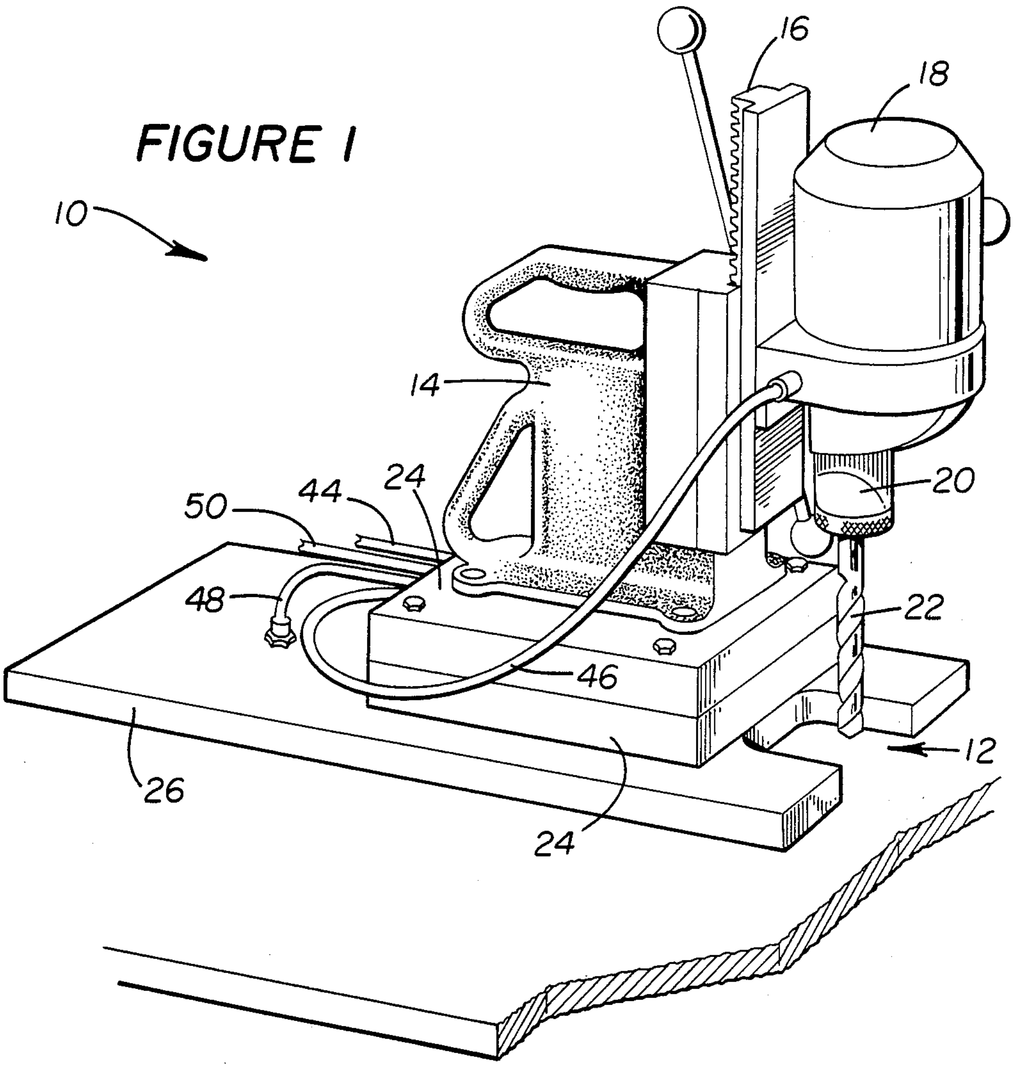
FIG. 1 is a perspective view of an embodiment of the material working tool of the invention.

With reference to the figures, and in particular to FIG. 1, a material working tool is depicted and denoted by the number 10. The material working tool 10 includes a base 12 upon which is mounted an upright support 14 which includes a positioning mechanism 16. A motor or actuator 18 is secured to the positioning mechanism such that the positioning mechanism can position the motor relative to the upright support 14 as in known in the art. Secured to the motor 18 is a spindle 20 and secured to the spindle is a cutter 22 which can accomplish the required material working.

Figure 2:
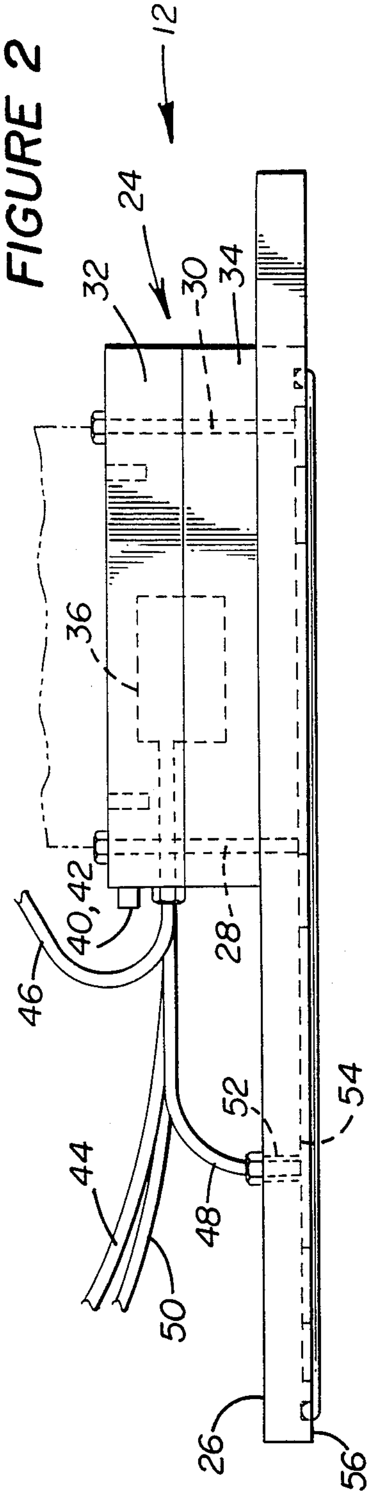
FIG. 2 is a side view of the vacuum base of the embodiment of the invention of FIG. 1.
Figure 3:
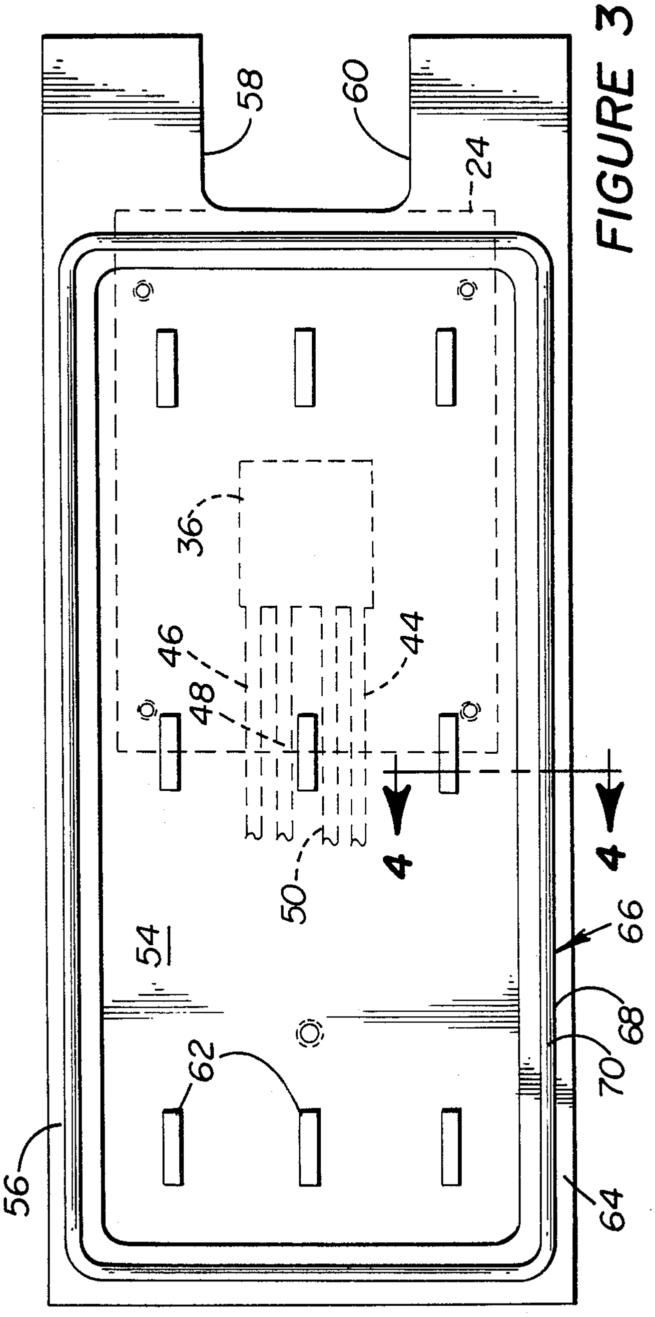
FIG. 3 is a bottom view of the vacuum base of FIG. 2.

The vacuum base 12 as depicted in FIGS. 1 and 2 includes a spacer 24 to which the upright support 14 is secured and a rigid member or foot 26. The spacer 24 is secured to the upright support 14 by bolts. The rigid member or foot 26 is secured to the spacer 24 by bolts 28 and 30. The spacer 24 in a preferred embodiment is comprised of upper and lower portions 32 and 34. These portions define therebetween a cavity 36. The cavity 36 houses the compressed air and vacuum system 38 of FIG. 8. Extending rearwardly from the upper portion 32 are first and second on/off switches 40 and 42 for the compressed air and vacuum system 38. The purpose of these switches and the compressed air and vacuum system 38 will be discussed more fully hereinbelow.

A source of compressed air is communicated through conduit 44 and bore in spacer 24 to the compressed air and vacuum system 38. From the compressed air and vacuum system 38, the source of compressed air is communicated through spacer 24 and conduit 46 to the motor 18 to drive the spindle 20 and cutter 22. Also a vacuum conduit 48 communicates through a bore in spacer 24 with the compressed air and vacuum system 38. The vacuum conduit 48 further communicates with the foot 26 to provide a source of vacuum to the foot 26. A conduit 50 returns spent compressed air for discharging to the atmosphere. Further it is understood that spent air is discharged to the atmosphere from the motor 18.

The foot 26 includes a port 52 which communicates with the vacuum conduit 48. The port 52 communicates with a cavity 54 defined by the foot 26. Cavity 54 in a preferred embodiment is approximately 0.125 inches deep and substantially covers the entire bottom surface 56 of the foot 26 except for two forwardly extending portions 58 and 60 which extend about opposite sides of the cutter 26 as the cutter is moved into engagement with the material to be worked. Portions 58 and 60 can be excluded from alternate embodiments. Extending into the cavity 54 from the foot 26 are a plurality of supports 62 which in a preferred embodiment are used to support the remainder of the foot along with the forward extending portions 58 and 60 and a peripheral portion 64. To the peripheral portion 64 is mounted the sealing means 66 for providing a vacuum seal between the cavity 54 and the surface to be worked. In a preferred embodiment the sealing means includes a groove 68 which is defined in the peripheral portion 64 and which receives an elastomeric O-ring 70 or similar static seal. It is to be understood that O-rings 70 other than that shown, as for example a quad-ring can be substituted into the groove. In a preferred embodiment it is found that for an O-ring which has a diameter of 0.139 inches that a preferred depth of the groove 68 is about 0.09375 inches with a preferred width of 0.1875 inches. With this configuration the O-ring is compressed between the foot 26 and the work surface as vacuum is applied so that the foot comes into contact with the work surface and a seal is formed. Other configurations are within the scope of the invention.

It is to be appreciated that, as is known in the art, adhesive can be used to secure the O-ring 70 into the groove 68. Other methods of securing the O-ring into the groove are shown in FIGS. 5 and 6. In FIG. 5 a wear plate 72 is positioned over the groove 68' in order to capture the O-ring in the groove 68'. The wear plate provides a lip 73 which retains the O-ring in the groove. Wear plates (not shown) are additionally secured over the support 62. The wear plate can be replaced as required due to wear. It is to be understand that the depth of the groove 68' is reduced by the thickness of the wear plate so that in this preferred embodiment the dimensions previously indicated for the groove are maintained so that contact can be made between the working surface and the foot 26.

In yet another embodiment, the groove 68'' is provided with undercuts with receive the O-ring 70'' and retain it in the groove 68''.

It is to be understood that the foot can have additional configuration as shown in FIG. 7. In FIG. 7, foot 26' is shown in a semicircular configuration so that it can mount, for example, a pipe that is to be machined. The foot 26' of the base 12' includes support 62', a peripheral portion 64' and a sealing means 66' which are similar in design and configuration except for the contour to the similar items in the foot 26.

In FIG. 8, a schematic of the compressed air and vacuum system 38 is shown. System 38 is connected to a source of compressed air at point 74. Point 74 communicates with compressed air conduit 44. Conduit 74 communicates with conduit 76 and 78 respectively. Conduit 78 communicates with an on/off two-position manual detent valve 40. In a first position this valve allows communication between conduit 78 and conduit 80. In a second position communication is prevented. Conduit 80 communicates with a vacuum generator 82 which essentially includes a venturi chamber. As the compressed air is urged through the venturi chamber, a vacuum is formed as is well known in the industry. This vacuum is communicated through conduit 84 through the bore in the spacer 24 to the conduit 48. Exhaust compressed air is communicated to conduit 86 and therefrom through a bore in spacer 24 to the exhaust conduit 50. Vacuum line 84 communicates through conduit 88 to a vacuum loss safety switch 90. When a vacuum is in line 88 the switch 90 is held down against a spring so that conduit 76 communicates with conduit 92 to provide compressed air to the on/off switch 42. The on/off switch 42 as the name implies includes a first position which provides communication between conduit 92 and conduit 94 and a second position which prevents communication between these two conduits. Conduit 94 communicates through the spacer 24 to conduit 46 and provides, when the on/off switch is in the on position and when the vacuum switch 90 is held down by the vacuum in line 88, compressed air to run the motor or actuator 18.

INDUSTRIAL APPLICABILITY

The operation of material working tool of the invention is as follows. First, the tool 10 is connected to a source of compressed air. Then the tool is positioned so that the appropriate material working can be accomplished. The vacuum on/off switch 40 is pushed in so that compressed air is communicated to the vacuum generator 82 so that a vacuum is created in cavity 54 firmly and positively securing the foot to the working surface. Vacuum opens the vacuum loss safety switch 90 to allow communication of compressed air to on/off switch 42. When on/off switch 42 is pressed, compressed air is fed to the motor 18 causing the spindle and cutter 22 to turn so that the material working process can be commenced. Should vacuum be lost in the foot, the vacuum loss switch 90 would immediately close, shutting of the motor or actuator 18 and preventing further material working.

Also it is to be understood that if an electric motor or actuator 18 is used, switch 90 can be modified to shut off electricity to motor 18 should vacuum be lost.

It is to be understood that the vacuum base 12 can be used in alternate configurations than that shown above and come within the spirit of the invention. For example, the vacuum base 12 with an appropriate universal connector can be mounted to a varity of pneumatic or electric cutting or material working tools. Further the vacuum base can be used to mount an object other than a tool to a desired surface.

From the above it can be seen that the present invention provides for a material working tool which can be mounted to a variety of materials and also provides for accurate and positive positioning of the working tool relative to the material to be worked.

Other aspects, objects and advantages of the invention can be learned from a review of the claims and appended figures.

I claim:

1. A material working tool comprising:

means for working material;

base means for supporting the means for working material;

means for securing the base means for the means for working material;

said base means including a rigid member adapted to make contact with the working material;

cavity defined in the rigid member, said cavity adapted to be connected with a source of vacuum;

sealing means located about said cavity and adapted for providing a seal between the rigid member and the working material with the rigid member in contact with the working material; and wherein said rigid member includes a plurality of supports extending into the space defined by said cavity.

2. The tool of claim 1 wherein said sealing means includes a groove defined in said rigid member and located about said cavity and a resilient member located in said groove.

3. The tool of claim 2 wherein said groove is dimensioned with respect to the resilient member such that said resilient member is compressed between the rigid plate and a working material when vacuum is applied to the cavity so that the rigid member comes into contact with the work surface.

4. The tool of claim 2 including a wear plate for protecting the rigid member and for holding said resilient member in the groove.

5. The tool of claim 2 wherein said groove has an undercut portion means for holding said resilient member in said groove.

6. The tool of claim 1 wherein said rigid member includes a peripheral portion located about said sealing means, the peripheral portion and said supports having support surfaces that are all in substantially the same plane.

7. The tool of claim 1 wherein said rigid member includes a peripheral portion located about said sealing means, the peripheral portion and said supports having support surfaces adapted to conform to a work surface.

8. The tool of claim 1 wherein said rigid member includes a peripheral portion located about said sealing means, the peripheral portion having a support surface adapted to conform to a work surface.

9. A material working tool comprising:

means for working material;

base means for supporting the means for working material;

means for securing the base means to the means for working material; and said base means including:

a rigid member;

a cavity defined in the rigid member, said rigid member including a plurality of supports extending into the space defined by said cavity;

sealing means located about said cavity and adapted for providing a seal between the rigid plate and the working material;

vacuum generation means for generating a vacuum;

means for communicating the vacuum generation means with said cavity.

10. The tool of claim 9 wherein said vacuum generation means is adapted to be connected to a sources of gas under pressure.

11. The tool of claim 9 including a vacuum activated switch means for turning off the means for working material should vacuum be lost in said cavity.

12. The tool of claim 9 including switch means for manually turning the vacuum generation means on and off; and switch means for manually turning the means for working material on and off.

13. The tool of claim 9 wherein said means for working material is operable with the application of a source of gas under pressure thereto, said tool further including:

means adapted for connecting said means for working material and said vacuum generation means to a source of gas under pressure.

14. A vacuum support base comprising a rigid member adapted to make contact with a working material;

cavity defined in the rigid member, said cavity adapted to be connected with a source of vacuum;

sealing means located about said cavity and adapted for providing a seal between the rigid member and the working material with the rigid member in contact with the working material; and wherein said rigid member includes a plurality of supports extending into the space defined by said cavity.

15. The tool of claim 14 wherein said sealing means includes a groove defined in said rigid member and located about said cavity and a resilient member located in said groove.

16. The tool of claim 15 wherein said groove is dimensioned with respect to the resilient member such that said resilient member is compressed between the rigid member and the working material when vacuum is applied to the cavity so that the rigid member comes into contact with the working material.

17. The tool of claim 15 including a wear plate for protecting the rigid member and for holding said resilient member in the groove.

18. The tool of claim 15 wherein said groove has an undercut portion means for holding said resilient member in said groove.

19. The tool of claim 14 wherein said rigid member includes a peripheral portion located about said sealing means, the peripheral portion and said supports having support surfaces that are all in substantially the same plane.

20. The tool of claim 14 wherein said rigid member includes a peripheral portion located about said sealing means, the peripheral portion and said supports having support surfaces adapted to conform to a work surface.

21. The tool of claim 14 wherein said rigid member includes a peripheral portion located about said sealing means, the peripheral portion having a support surface adapted to conform to a work surface.

22. A vacuum support base comprising:

a rigid member adapted to make contact with a working material;

a cavity defined in the rigid member, wherein said rigid member includes a plurality of supports extending into the space defined by said cavity;

sealing means located about said cavity and adapted for providing a seal between the rigid member and a working material with rigid member in contact with the working material;

vacuum generation means for generating a vacuum;

means for communicating the vacuum generation means with said cavity.

23. The tool of claim 22 wherein said vacuum generation means is adapted to be connected to a source of gas under pressure.

24. The tool of claim 22 including a vacuum activated switch means for turning off the means for working material should vacuum be lost in said cavity.

* * * * *

UNITED STATES PATENT AND TRADEMARK OFFICE

CERTIFICATE OF CORRECTION

PATENT NO. : 4,582,460

DATED : April 15, 1986

INVENTOR(S) : Howard Z. Silverberg
Jack G. Fonss

It is certified that error appears in the above-identified patent and that said Letters Patent is hereby corrected as shown below:

In Column 2, line 64, "in known in the art.", should be -- as known in the art. --.

In Column 4, line 9, "configuration" should be -- configurations --.

In Column 4, line 6, "with undercuts with receive", should be -- with undercuts which receive --.

Column 5, line 22, "the base means for the means for", should be -- the base means to the means for --.

Column 6, line 15, "connected to a sources of", should be -- connected to a source of --.

Signed and Sealed this

Twenty-third Day of December, 1986

*Attest:*

DONALD J. QUIGG

*Attesting Officer* *Commissioner of Patents and Trademarks*